(12) United States Patent
Hagihara

(10) Patent No.: US 11,279,220 B2
(45) Date of Patent: Mar. 22, 2022

(54) WORKING VEHICLE WITH TRAVELING DEVICE HAVING WHEELS

(71) Applicant: HITACHI CONSTRUCTION MACHINERY CO., LTD., Tokyo (JP)

(72) Inventor: Shinichirou Hagihara, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 383 days.

(21) Appl. No.: 16/490,992

(22) PCT Filed: May 21, 2018

(86) PCT No.: PCT/JP2018/019518
§ 371 (c)(1),
(2) Date: Sep. 4, 2019

(87) PCT Pub. No.: WO2018/230270
PCT Pub. Date: Dec. 20, 2018

(65) Prior Publication Data
US 2020/0016973 A1 Jan. 16, 2020

(30) Foreign Application Priority Data

Jun. 12, 2017 (JP) .............................. JP2017-115254

(51) Int. Cl.
*B60K 7/00* (2006.01)
*F16H 57/04* (2010.01)
(52) U.S. Cl.
CPC ............ *B60K 7/0007* (2013.01); *F16H 57/04* (2013.01); *B60K 2007/0038* (2013.01)
(58) Field of Classification Search
CPC .......... B60K 7/0007; B60K 2007/0092; F16H 57/04
See application file for complete search history.

(56) References Cited

U.S. PATENT DOCUMENTS

| 6,752,227 B1* | 6/2004 | Bachmann | ........... B60K 7/0007 180/65.51 |
| 2005/0250611 A1* | 11/2005 | Jurado | ................ B60K 17/046 475/159 |

(Continued)

FOREIGN PATENT DOCUMENTS

| JP | 2013-053711 A | 3/2013 |
| JP | 2014-073730 A | 4/2014 |

OTHER PUBLICATIONS

International Search Report of PCT/JP2018/019518 dated Aug. 21, 2018.

*Primary Examiner* — Jeffrey J Restifo
(74) *Attorney, Agent, or Firm* — Mattingly & Malur, PC

(57) ABSTRACT

A traveling device (11) is provided with an electric motor (16) provided in a vehicle body (2) of a dump truck (1), an output shaft (17) an axial base end of which is connected to the electric motor (16) and which outputs rotation of the electric motor (16), a bottomed hole spline (53) formed in an axial front end of the output shaft (17), and an input shaft (42) which has a shaft spline (54) spline-coupled to the hole spline (53), and inputs the rotation of the output shaft (17) to a reduction gear mechanism (27). The output shaft (17) is provided with an oil reservoir space (55) formed in the innermost part of the hole spline (53), an annular oil groove (56) and an oil path (57) providing communication between the oil reservoir space (55) and the annual oil groove (56). Lubricant oil (100) supplied to the annular oil groove (56) is supplied via the oil path (57) to the oil reservoir space (55), and is supplied to a spline joint between the hole spline (53) and the shaft spline (54) with rotation of the output shaft (17).

3 Claims, 10 Drawing Sheets

(56) References Cited

U.S. PATENT DOCUMENTS

| | | | | |
|---|---|---|---|---|
| 2006/0063630 | A1* | 3/2006 | Jurado | F16H 57/0421 475/159 |
| 2009/0283345 | A1* | 11/2009 | Kabrick | B60K 17/046 180/65.51 |
| 2009/0312135 | A1* | 12/2009 | Shibukawa | B60K 7/0007 475/159 |
| 2010/0140020 | A1* | 6/2010 | Murahashi | F16H 57/0434 184/6.12 |
| 2012/0142475 | A1* | 6/2012 | Shibukawa | B60K 17/046 475/159 |
| 2012/0200043 | A1* | 8/2012 | Witcher | F16D 65/12 277/306 |
| 2012/0217079 | A1* | 8/2012 | Besler | B60B 35/16 180/233 |
| 2012/0217788 | A1* | 8/2012 | Vallejo | B60K 17/046 301/6.5 |
| 2012/0217793 | A1* | 8/2012 | Drum | F16H 57/0445 301/124.1 |
| 2012/0219351 | A1* | 8/2012 | Besler | F16D 1/101 403/37 |
| 2012/0231915 | A1* | 9/2012 | Vallejo | B60B 35/125 475/149 |
| 2013/0065724 | A1* | 3/2013 | Shinohara | F16H 57/0479 475/159 |
| 2013/0152570 | A1* | 6/2013 | Hoshinoya | B60L 3/0023 60/396 |
| 2015/0084397 | A1* | 3/2015 | Kudo | B60B 27/0015 301/6.5 |
| 2015/0107406 | A1* | 4/2015 | Tarbell | F16D 1/101 74/640 |
| 2015/0231959 | A1* | 8/2015 | Ishikawa | B60K 17/145 301/6.5 |
| 2017/0008386 | A1* | 1/2017 | Uranaka | B60G 7/005 |
| 2018/0252278 | A1* | 9/2018 | Naitou | F16D 55/40 |
| 2018/0354473 | A1* | 12/2018 | Naitou | B60K 11/06 |
| 2020/0016973 | A1* | 1/2020 | Hagihara | B60K 7/0007 |
| 2020/0153291 | A1* | 5/2020 | Van Der Wal | H02K 9/193 |
| 2020/0207204 | A1* | 7/2020 | Kim | F16H 57/02 |
| 2020/0208733 | A1* | 7/2020 | Kim | F16H 57/0424 |
| 2021/0061093 | A1* | 3/2021 | Li | B60B 35/002 |
| 2021/0107349 | A1* | 4/2021 | Oldeide | B60K 7/0007 |
| 2021/0114454 | A1* | 4/2021 | Francis | F16H 57/0476 |
| 2021/0122227 | A1* | 4/2021 | Bindl | B60T 1/062 |
| 2021/0162856 | A1* | 6/2021 | Shoda | B60K 7/0007 |
| 2021/0221218 | A1* | 7/2021 | Li | B60T 1/067 |
| 2021/0252967 | A1* | 8/2021 | Iwabuchi | B60B 35/14 |

* cited by examiner

WORKING VEHICLE WITH TRAVELING DEVICE HAVING WHEELS

TECHNICAL FIELD

The present invention relates to a working vehicle with a traveling device having wheels, such as a dump truck, a wheel type excavator, a wheel loader, and the like.

BACKGROUND ART

As a working vehicle having at least four wheels in the left and right sides and the front and rear sides, there is known a large-sized transportation vehicle called a dump truck to be used mainly in an excavating site in a mine. This dump truck is provided with a vehicle body having a frame on which wheels are mounted to be rotatable, and a vessel (a loading platform) provided to be liftable on the frame of the vehicle body. The dump truck travels for transporting cargo such as crushed stones or the like which is excavated in an excavating site by an excavating machine such as a hydraulic excavator and is thereon loaded to a desired transportation place in a state of the cargo being loaded on the vessel (refer to Patent Document 1).

Here, a traveling device of a dump truck is provided with an electric motor mounted to a frame of a vehicle body, and a reduction gear which reduces rotation outputted from an output shaft of the electric motor and transmits the reduced rotation to wheels. An axial front end of the output shaft is provided with a bottomed hole spline, and an input shaft having a shaft spline is spline-coupled to the hole spline, and the rotation of the output shaft is inputted to the reduction gear via the input shaft.

At the traveling of the dump truck, a power generator is driven by an engine disposed in the vehicle body and thereby, power from the power generator is supplied to the electric motor to rotate the output shaft of the electric motor. When the rotation of the output shaft is inputted via the input shaft to the reduction gear, the reduction gear reduces the rotation of the output shaft to rotate and drive the wheels with a large torque. Thereby, a large-sized dump truck with a weight object loaded on the vessel can be traveled (transported) to a desired transportation site.

PRIOR ART DOCUMENT

Patent Document

Patent Document 1: Japanese Patent Laid-Open No. 2013-53711 A

SUMMARY OF THE INVENTION

Incidentally, in the traveling vehicle of the dump truck which is a representative example of the working vehicle with the traveling device having the wheels according to the aforementioned conventional technology, a rotating load of a large torque acts on a spline joint between a hole spline provided in a front end of the output shaft and a shaft spline provided in the input shaft. Therefore, grease is fed on a tooth surface of the hole spline and a tooth surface of the shaft spline on a regular basis, and this grease provides lubrication on the spline joint between the output shaft and the input shaft.

However, in a case of using the grease to lubricate the spline joint, it is difficult to discharge abrasion powder generated due to abrasion between the hole spline and the shaft spline to an exterior of the spline joint. Therefore, in a method of feeding the grease on the spline joint, the abrasion between the hole spline and the shaft spline is possibly accelerated by the remaining abrasion powder.

On the other hand, there is considered a method of supplying lubricant oil lower in viscosity than grease to the spline joint (forced lubrication). In a case of performing the forced lubrication using the lubricant oil, however, it is required to additionally provide an axial oil bore in the hole spline or the shaft spline, or a mechanism for supplying lubricant oil to the rotating output shaft or input shaft. Therefore, there is posed a problem that the surrounding structure of the spline joint becomes complicated. Meanwhile, in a case of supplying the lubricant oil to the spline joint from an opening side of the hole spline, the lubricant oil is supplied to an opening periphery of the hole spline in the spline joint. However, there is posed a problem that it is difficult to discharge the abrasion powder generated due to abrasion between the hole spline and the shaft spline to an exterior.

The present invention is made in view of the foregoing problems in the conventional technology, and an object of the present invention is to provide a working vehicle with a traveling device having wheels, which can discharge abrasion powder generated in a spline joint between a hole spline and a shaft spline to an exterior and can lubricate the spline joint appropriately.

In order to solve the aforementioned problems, the present invention is applied to a working vehicle with a traveling device having wheels, comprising an electric motor provided on a vehicle body of the working vehicle having wheels, an output shaft an axial base end of which is connected to the electric motor and which outputs rotation of the electric motor, a reduction mechanism which is provided in the vehicle body and reduces rotation of the output shaft to be transmitted to the wheels, a bottomed hole spline formed in an axial front end of the output shaft, and an input shaft which has a shaft spline spline-coupled to the hole spline and inputs the rotation of the output shaft to the reduction mechanism.

The present invention is characterized in that the output shaft is provided with an oil reservoir space which is formed in an axial innermost part of the hole spline to reserve the lubricant oil, an entire circumference oil path which is separated axially toward the base end side from the oil reservoir space and is formed over an entire circumference in an outer circumference side of the output shaft, and an oil path which provides communication between the oil reservoir space and the entire circumference oil path and supplies the lubricant oil supplied to the entire circumference oil path to the oil reservoir space, and an inner diameter dimension of the oil reservoir space is formed to be larger than a tooth root circle diameter of the hole spline to cause the lubricant oil in the oil reservoir space to be supplied to the spline joint between the hole spline and the shaft spline by the rotation of the output shaft.

According to the present invention, the lubricant oil supplied to the entire circumference oil path is introduced into the oil reservoir space in the innermost part of the hole spline via the oil path, and is supplied to the spline joint through gaps between the hole spline and the shaft spline from the oil reservoir space. As a result, the abrasion powder generated in the spline joint can be discharged to the exterior by the lubricant oil. In addition, it is possible to appropriately lubricate the spline joint between the hole spline and the shaft spline.

MODE FOR CARRYING OUT THE INVENTION

Hereinafter, an explanation will be in detail made of a working vehicle with a traveling device having wheels according to embodiments of the present invention with reference to the accompanying drawings by taking a traveling device in a dump truck of a rear-wheel drive type as an example.

Figure 1:
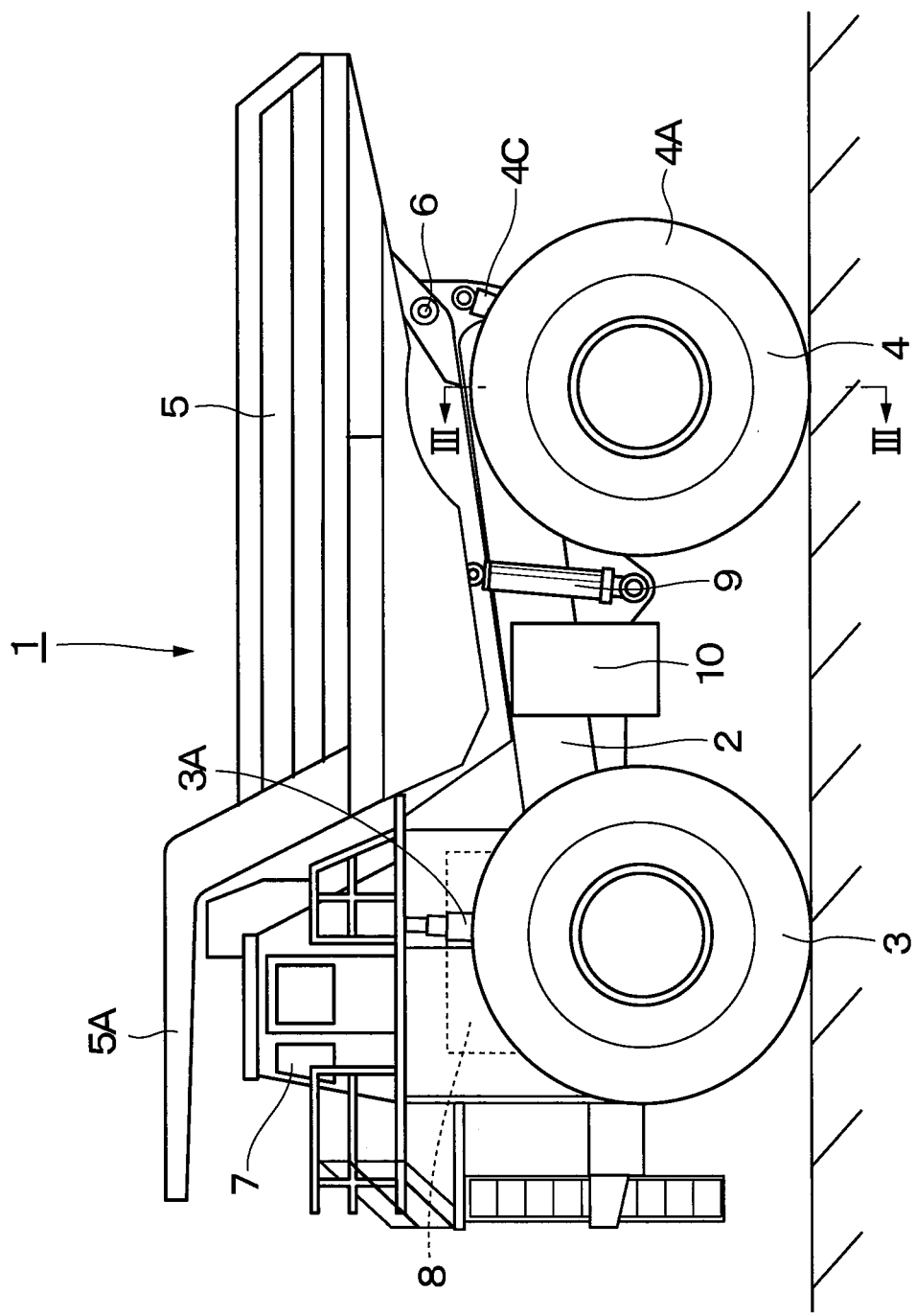
FIG. 1 is a front view showing a dump truck as a working vehicle with a traveling device having wheels according to a first embodiment of the present invention.
Figure 2:
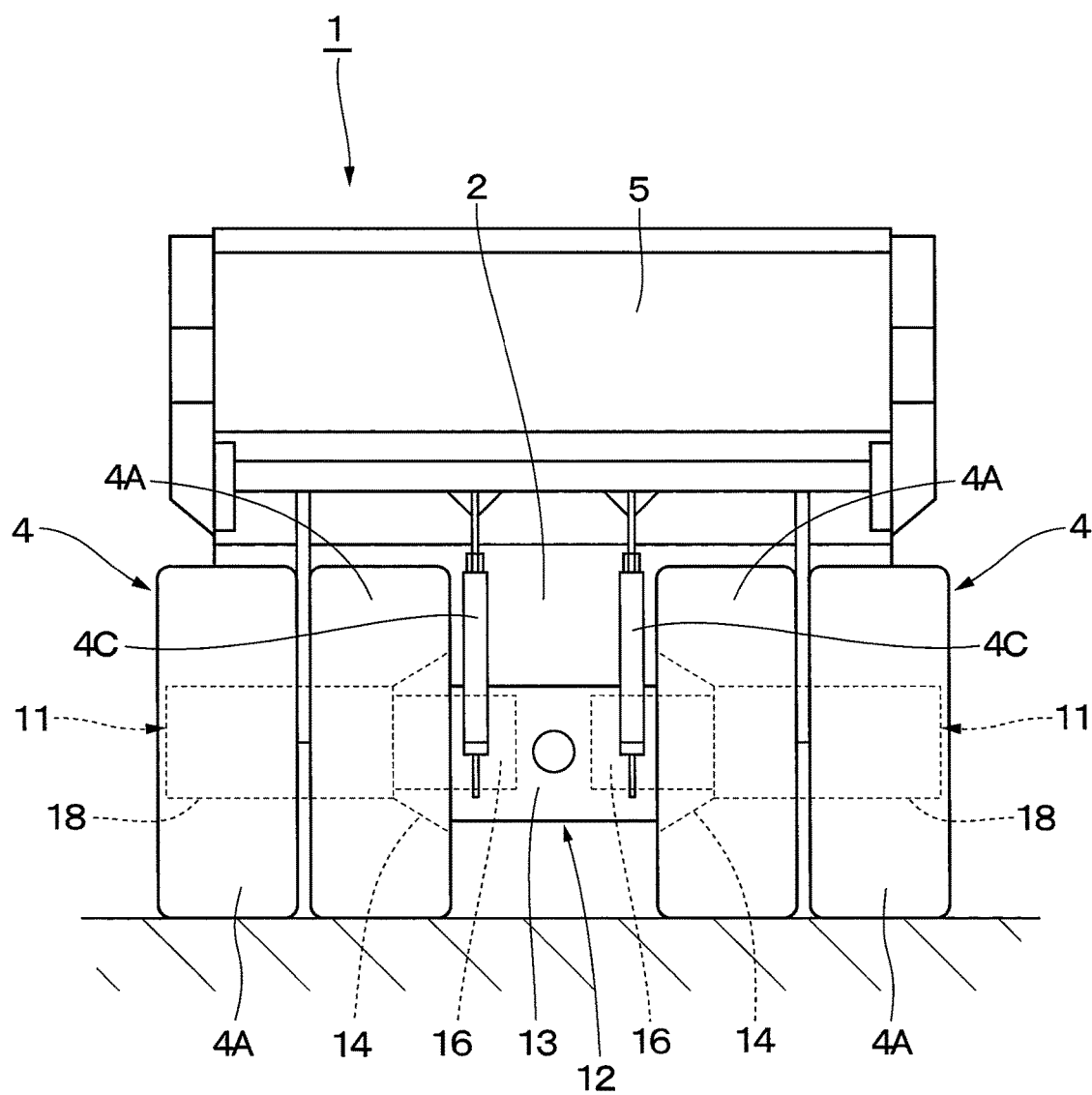
FIG. 2 is a right side view showing the dump truck in FIG. 1 as viewed from the backside.

FIG. 1 to FIG. 11 show a first embodiment of the present invention. In FIG. 1 and FIG. 2, a dump truck 1, which is a representative example of a working vehicle with a traveling device having wheels, has a vehicle body 2 of a strong frame structure. Left and right front wheels 3 (only the left side is shown) are rotatably provided in a front part side of the vehicle body 2, and left and right rear wheels 4 are rotatably provided in a rear part side of the vehicle body 2. The left and right front wheels 3 define steering wheels which are steered (a steering operation) by an operator of the dump truck 1. A front wheel side suspension 3A composed of hydraulic shock absorbers and the like is provided between the vehicle body 2 and the left and right front wheels 3.

Figure 3:
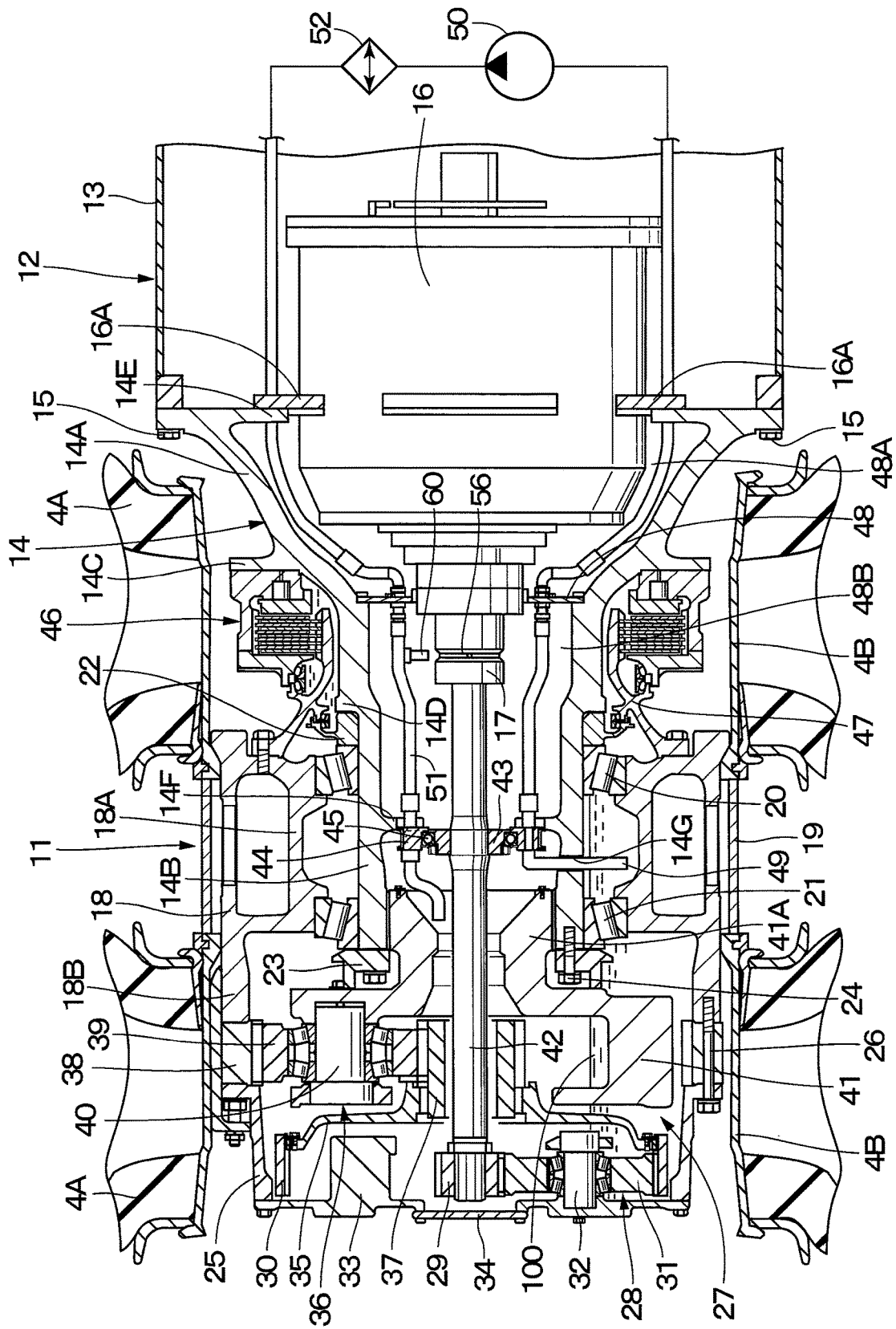
FIG. 3 is an enlarged cross section showing the traveling vehicle in the rear wheel side, as viewed in a direction of arrows III-III in FIG. 1.

The left and right rear wheels 4 define drive wheels of the dump truck 1, and are driven and rotated by an after-mentioned traveling device 11. As shown in FIG. 2 and FIG. 3, the rear wheel 4 is configured to include axial inner and outer tires 4A as dual tires and rims 4B located in radial inner sides of the respective tires 4A. A rear wheel side suspension 4C composed of hydraulic shock absorbers and the like is provided between the vehicle body 2 and the left and right rear wheels 4.

A vessel 5 (a loading platform) is mounted on the vehicle body 2 to be liftable thereon. The vessel 5 is formed, for example, as a large-sized container of an entire length of 10 to 13 meters for loading a large volume of heavy baggage such as crushed stones. A rear-side bottom part of the vessel 5 is coupled to a rear end side of the vehicle body 2 by using a coupling pin 6 or the like to be capable of lifting (tilting) thereto. In addition, a protector 5A is integrally provided in a front-side top part of the vessel 5 in such a manner as to cover a cab 7 to be described later from the upper side.

The cab 7 is provided in the front part of the vehicle body 2 to be positioned under the protector 5A provided in the vessel 5. The cab 7 forms part of an operator's room which an operator of the dump truck 1 gets in and off. An operator's seat, an activation switch, an accelerator pedal, a brake pedal, a handle for steering, a plurality of operating levers (any of them is not shown), and the like are provided inside of the operator's room. The protector 5A of the vessel 5 protects the cab 7 from flying stones such as rocks by completely covering the cab 7 from the upper side.

An engine 8 is provided in the front side of the vehicle body 2 to be positioned under the cab 7. The engine 8 is configured by, for example, a large-sized diesel engine and drives a power generator disposed on the vehicle body 2 and a hydraulic pump as a hydraulic source (any thereof is not shown) for rotation. Hydraulic oil delivered from the hydraulic pump is supplied to below-described hoist cylinders 9, a steering cylinder for power steering (not shown), and the like.

The hoist cylinders 9 are mounted between the vehicle body 2 and the vessel 5 to telescopically operate in the upper-lower direction. The hoist cylinder 9 is positioned between the front wheel 3 and the rear wheel 4 to be disposed in each of both left and right sides (only the left side is shown) of the vehicle body 2. The hoist cylinder 9 expands and contracts in the upper-lower direction by delivery or suction of the hydraulic oil from or to the hydraulic pump to lift (tilt) the vessel 5 around the coupling pin 6.

A hydraulic oil tank 10 is mounted to a lateral surface of the vehicle body 2 or the like to be positioned under the vessel 5. The hydraulic oil accommodated in the hydraulic oil tank 10 is suctioned by the hydraulic pump to be pressurized oil, which is supplied or discharged to or from the hoist cylinder 9, the steering cylinder for power steering, and the like.

The traveling devices 11 are provided to the sides of at least the rear wheels 4 (to both of the left and right rear wheels 4) in the dump truck 1. As shown in FIG. 3, the traveling device 11 is configured by including an axle housing 12, an electric motor 16, a wheel mounting cylinder 18 and a reduction gear mechanism 27, which will be described later. The traveling device 11 decelerates rotation of the electric motor 16 by the reduction gear mechanism 27 and drives the rear wheels 4 as drive wheels in the dump truck 1 together with the wheel mounting cylinder 18 by a large rotational torque.

The axle housing 12 for the rear wheel 4 is provided in a rear part side of the vehicle body 2. As shown in FIG. 2, the axle housing 12 is formed in a cylindrical body which axially extends between the left and right rear wheels 4. The axle housing 12 is configured by an intermediate suspension cylinder 13 mounted via a rear wheel side suspension 4C to the rear part side of the vehicle body 2 and spindles 14, which will be described later, mounted respectively to both left and right sides of the suspension cylinder 13.

The spindles 14 are arranged respectively at both of axial end sides of the axle housing 12. The spindle 14 is configured by including a large-diameter cylindrical part 14A which is positioned at an axial one side and is formed to be tapered, and a circular cylindrical part 14B which is formed integrally with the large-diameter cylindrical part 14A at an axial other side. The large-diameter cylindrical part 14A is removably fixed via bolts 15 and the like to the suspension cylinder 13. The circular cylindrical part 14B is disposed to axially extend within the wheel mounting cylinder 18 to be described later, and the circular cylindrical part 14B has an outer peripheral side rotatably supporting the wheel mounting cylinder 18 in the side of the rear wheel 4 via bearings 20 and 21 to be described later.

An annular flange part 14C and an annular step part 14D are formed integrally on an outer peripheral side of the spindle 14. The annular flange part 14C radially outwardly protrudes from an intermediate part of the large-diameter cylindrical part 14A in a length direction (axially), and the step part 14D is mounted to an axial one side of the circular cylindrical part 14B. A plurality of motor mounting seats 14E are mounted integrally to an axial one side of the large-diameter cylindrical part 14A to protrude radially inwards, and the electric motors 16 to be described later are mounted to the motor mounting seats 14E.

On the other hand, an axial other side (a front end side) of the circular cylindrical part 14B is formed as an open end, and a cylindrical protrusion part 41A of a carrier 41 to be described later is spline-coupled to an inner side thereof. A circular inner collar part 14F is formed integrally on an inner peripheral side of an axial intermediate part in the circular cylindrical part 14B. An outer retainer 44 to be described later is mounted via bolts or the like to the inner collar part 14F. A radial hole 14G is formed in the lower part side of the circular cylindrical part 14B to penetrate and extend therethrough in an upper-lower direction (a radial direction of the circular cylindrical part 14B), and a suction pipe 49 to be described later is inserted into the radial hole 14G.

The electric motor 16 for travel is removably mounted in the axle housing 12. A rotor (not shown) in the electric motor 16 is rotated in the forward direction or in the backward direction by power to be supplied from a power generator (not shown) mounted on the vehicle body 2, and the rotation of this rotor is outputted by an output shaft 17 to be described later. As shown in FIG. 2, the electric motors 16 are mounted respectively within the spindles 14 to be positioned in both left and right sides of the suspension cylinder 13 to drive and rotate the left and right rear wheels 4 independently with each other. A casing of the electric motor 16 is provided with a plurality of mounting flanges 16A, which are removably mounted to the motor mounting seat 14E of the spindle 14 by using bolts or the like.

The output shaft 17 has an axial base end connected integrally to the rotor of the electric motor 16 to output the rotation of the electric motor 16 (the rotor). An axial front end of the output shaft 17 protrudes to an exterior from the casing of the electric motor 16, and a hole spline 53 to be described later is formed in the front end of the output shaft 17 (refer to FIG. 4). An input shaft 42 to be described later is connected coaxially to the front end of the output shaft 17.

A rim 4B of the rear wheel 4 is removably mounted to the wheel mounting cylinder 18 by means such as press-fitting. The wheel mounting cylinder 18 is formed as a stepped cylindrical body having a hollow cylindrical part 18A to form a hollow structure, and an extending cylindrical part 18B. The hollow cylindrical part 18A extends axially over between bearings 20, 21 to be described later. The extending cylindrical part 18B axially extends integrally from an outer peripheral side end part of the hollow cylindrical part 18A toward an internal gear 38 to be described later.

The internal gear 38 and an outer drum 25 to be described later are integrally fixed to the extending cylindrical part 18B of the wheel mounting cylinder 18 by using long bolts 26 or the like, and the wheel mounting cylinder 18 is rotated integrally with the internal gear 38. That is, rotation of a large torque obtained by decelerating the rotation of the electric motor 16 with the reduction gear mechanism 27 is transmitted via the internal gear 38 to the wheel mounting cylinder 18. Therefore, the wheel mounting cylinder 18 rotates the rear wheel 4 as the drive wheel with the large rotational torque.

A rim spacer 19 is composed of a cylindrical body, and is disposed at the outer peripheral side of the wheel mounting cylinder 18. The rim spacer 19 is disposed between the rim 4B in an axial inside and the rim 4B in an axial outside of the rear wheel 4 to ensure a constant gap therebetween. Thereby, an axial gap between the tire 4A in an axial inside and the tire 4A in an axial outside in the rear wheel 4 is set by the rim spacer 19.

The bearings 20 and 21 are provided between the circular cylindrical part 14B of the spindle 14 and the hollow cylindrical part 18A of the wheel mounting cylinder 18. The bearings 20, 21 each are configured, for example, by using the same conical bearing or the like, and rotatably support the wheel mounting cylinder 18 on the outer peripheral side of the spindle 14. Here, the one bearing 20 is positioned via a bearing retainer 22 to be described later to the step part 14D of the spindle 14. The other bearing 21 is positioned via the other bearing retainer 23 to be described later to an open end-side outer periphery of the circular cylindrical part 14B.

The bearing retainer 22 is provided to be fitted on an outer peripheral surface of the circular cylindrical part 14B of the spindle 14. An axial one side of the bearing retainer 22 abuts on the annular step part 14D of the spindle 14, and an axial other side of the bearing retainer 22 abuts on an inner race of the bearing 20. Accordingly, an outer race side of the bearing 20 is axially positioned by the hollow cylindrical part 18A of the wheel mounting cylinder 18, and an inner race side of the bearing 20 is axially positioned by the bearing retainer 22.

The other bearing retainer 23 is mounted on an open end of the circular cylindrical part 14B of the spindle 14 by using a plurality of bolts 24. The other bearing retainer 23 is fixed to the circular cylindrical part 14B and axially positions an inner race side of the bearing 21. That is, an outer race side of the bearing 21 is axially positioned by the hollow cylindrical part 18A of the wheel mounting cylinder 18, and the inner race side of the bearing 21 is axially positioned by the other bearing retainer 23. Therefore, the wheel mounting cylinder 18 is axially positioned to the spindle 14 by using the bearings 20 and 21 and the bearing retainers 22 and 23, and is supported to the spindle 14 to be rotatable in a circumferential direction thereto.

The outer drum 25 forms a part of the wheel mounting cylinder 18 together with the internal gear 38. The outer drum 25 is mounted in a position at an axial outside of the wheel mounting cylinder 18 to sandwich the internal gear 38 therebetween and is removably fixed to the wheel mounting cylinder 18 by using a plurality of long bolts 26.

The reduction gear mechanism 27 as the reduction mechanism is provided between the spindle 14 and the wheel mounting cylinder 18. The reduction gear mechanism 27 is configured by a first-stage planetary gear reduction mechanism 28 and a second-stage planetary gear reduction mechanism 36, which will be described later. The reduction gear mechanism 27, by transmission of rotation of the output shaft 17 via the input shaft 42 to be described later thereto, decelerates the rotation of the output shaft 17, which is transmitted to the wheel mounting cylinder 18. Therefore, the wheel mounting cylinder 18 is driven and rotated together with the rear wheel 4 by a large rotational force (torque) obtained by the deceleration.

The first-stage planetary gear reduction mechanism 28 is configured by a sun gear 29 spline-coupled to the front end side of the input shaft 42, a plurality of planetary gears 31 (only one piece is shown), and a carrier 33. Each of the planetary gears 31 is meshed with the sun gear 29 and a ring-shaped internal gear 30, and the carrier 33 rotatably supports the planetary gear 31 through support pins 32.

The carrier 33 is removably fixed at its outer peripheral side to an open end (an end surface at an axially outside) of the outer drum 25 integral with the wheel mounting cylinder 18 by the use of bolts or the like. Accordingly, the carrier 33 rotates integrally with the wheel mounting cylinder 18 and the outer drum 25. For example, a disk-shaped lid plate 34 is removably mounted to an inner peripheral side of the carrier 33. The lid plate 34 is removed from the carrier 33, for example, at the time of inspection or maintenance of meshing parts between the sun gear 29 and the planetary gears 31.

The ring-shaped internal gear 30 is formed by using a ring gear to surround the sun gear 29 and the respective planetary gears 31 from a radial outside. The internal gear 30 is disposed with a radial small gap to an inner peripheral surface of the outer drum 25 to be rotatable relative to the outer drum 25. The rotation (revolving movement) of the internal gear 30 is transmitted via a coupling 35 to be described later to the second-stage planetary gear reduction mechanism 36.

As the sun gear 29 is rotated integrally with the input shaft 42 by the electric motor 16, the first-stage planetary gear reduction mechanism 28 converts the rotation of the sun gear 29 into a rotating movement of each of the planetary gears 31 on its axis and a revolving movement thereof. The rotating movement on its axis (rotation) of each of the planetary gears 31 is transmitted to the internal gear 30 as a decelerated rotation. The rotation of the internal gear 30 is transmitted to the second-stage planetary gear reduction mechanism 36 through the coupling 35. On the other hand, the revolving movement of each of the planetary gears 31 is transmitted to the outer drum 25 in the side of the wheel mounting cylinder 18 by way of rotation of the carrier 33. However, since the wheel mounting cylinder 18 rotates integrally with the second-stage internal gear 38 to be described later, the revolving movement of each of the planetary gears 31 is suppressed to rotation in synchronization with the internal gear 38 (the wheel mounting cylinder 18).

The coupling 35 is located between the first-stage planetary gear reduction mechanism 28 and the second-stage planetary gear reduction mechanism 36, and rotates integrally with the first-stage internal gear 30. An outer peripheral side of the coupling 35 is spline-coupled to the first-stage internal gear 30, and an inner peripheral side of the coupling 35 is spline-coupled to a second-stage sun gear 37 to be described later. Thereby, the coupling 35 transmits rotation of the first-stage internal gear 30 to the second-stage sun gear 37 to rotate the sun gear 37 integrally with the first-stage internal gear 30.

The second-stage planetary gear reduction mechanism 36 is configured by the cylindrical sun gear 37 which is positioned on an outer peripheral side of the input shaft 42 and rotates integrally with the coupling 35, a plurality of planetary gears 39 (only one of which is shown in the figure), and the carrier 41. Each of the planetary gears 39 is meshed with the sun gear 37 and the ring-shaped internal gear 38, and the carrier 41 rotatably supports the planetary gears 39 through support pins 40.

Here, the second-stage internal gear 38 is formed by using a ring gear surrounding the sun gear 37 and the planetary gears 39 and the like from a radial outside. The internal gear 38 is integrally fixed between the extending cylindrical part 18B forming a part of the wheel mounting cylinder 18 and the outer drum 25 by using the long bolts 26. Internal teeth formed over an entire circumference on the inner peripheral side of the internal gear 38 are held in a meshing state with the plurality of the planetary gears 39.

The cylindrical protrusion part 41A is formed to be integral with the center part of the second-stage carrier 41, and the cylindrical protrusion part 41A is fitted in the circular cylindrical part 14B of the spindle 14 from an open end side. That is, an outer peripheral side of the cylindrical protrusion part 41A is removably spline-coupled to an inner peripheral side of the circular cylindrical part 14B. The input shaft 42 and also a supply pipe 51 to be described later are inserted in an inner peripheral side of the cylindrical protrusion part 41A.

Here, in the second-stage planetary gear reduction mechanism 36, the cylindrical protrusion part 41A of the carrier 41 is spline-coupled to the circular cylindrical part 14B of the spindle 14, and thereby, restraining revolving movements of the respective planetary gears 39 (rotation of the carrier 41). Therefore, as the sun gear 37 is put in rotation integrally with the coupling 35, the second-stage planetary gear reduction mechanism 36 converts the rotation of the sun gear 37 into rotation of each of the planetary gears 39 on its axis, and transmits the rotation of each of the planetary gears 39 on its axis to the second-stage internal gear 38, which is decelerated for rotation. Thereby, the rotational torque of a large output obtained by the two-stage speed reduction through the first-stage planetary gear reduction mechanism 28 and the second-stage planetary gear reduction mechanism 36 is transmitted to the wheel mounting cylinder 18 to which the internal gear 38 is fixed.

The input shaft 42 is provided between the output shaft 17 and the reduction gear mechanism 27, and inputs rotation of the output shaft 17 to the reduction gear mechanism 27. The input shaft 42 is configured by one bar-shaped body extending axially within the circular cylindrical part 14B of the spindle 14. An axial base end of the input shaft 42 is connected (spline-coupled) to the output shaft 17, and an axial intermediate part of the input shaft 42 is rotatably supported via a shaft bearing 45 to be described later on the spindle 14. In addition, an axial front end side of the input shaft 42 protrudes from the circular cylindrical part 14B of the spindle 14, and the first-stage sun gear 29 is mounted to a front end (a protrusion end) thereof. Here, a shaft spline 54 to be described later is formed in the axial base end of the input shaft 42, and the shaft spline 54 is spline-coupled to the hole spline 53 of the output shaft 17 (refer to FIG. 4).

An inner retainer 43 is provided to be fitted into an axial intermediate part of the input shaft 42. The inner retainer 43 is press-fitted at the inner peripheral side into the intermediate part of the input shaft 42 to rotate integrally with the input shaft 42. An outer retainer 44 is fixed to an inner collar part 14F of the spindle 14 by using bolts or the like. The shaft bearing 45 is provided between the outer retainer 44 and the inner retainer 43.

The shaft bearing 45 is located between the inner retainer 43 in the side of the input shaft 42 and the outer retainer 44 in the side of the spindle 14, and rotatably supports the axial intermediate part of the input shaft 42 within the circular cylindrical part 14B of the spindle 14. Thereby, the long input shaft 42 can be suppressed from causing the core swing in the axial intermediate part, and can transmit stable rotation of the output shaft 17 to the first-stage sun gear 29.

A wet brake 46 applies braking forces to rotation of the wheel mounting cylinder 18 (that is, the left and right rear wheels 4), and is configured by a wet multi-plate type of hydraulic brake. The wet brake 46 is provided through a brake hub 47 to be described later between the spindle 14 in the axle housing 12 and the wheel mounting cylinder 18. The wet brake 46 applies braking forces to the brake hub 47 rotating together with the wheel mounting cylinder 18.

The brake hub 47 forms a part of the wet brake 46 and rotates together with the wheel mounting cylinder 18. The brake hub 47 is formed as a cylindrical body axially extending between the spindle 14 and the wet brake 46. Respective rotation side discs of the wet brake 46 are mounted to an axial one side of the brake hub 47 to be axially movable in a state of being prevented from rotating. An axial other side of the brake hub 47 is removably fixed to the hollow cylindrical part 18A of the wheel mounting cylinder 18 by a plurality of bolts.

Here, lubricant oil 100 is reserved in the inside of the wheel mounting cylinder 18, and the respective planetary gear reduction mechanisms 28, 36 operate in a state where the lubricant oil 100 is supplied all the time. In this case, an oil surface of the lubricant oil 100 is set to a position which is lower than, for example, the lowest part of the circular cylindrical part 14B forming part of the spindle 14 and where a lower side section of each of the bearings 20 and 21 is immersed. In consequence, at the operating of the traveling device 11, the lubricant oil 100 can be stirred by the respective planetary gear reduction mechanisms 28 and 36 to suppress a rise in a temperature, and to control a stirring resistance of the lubricant oil 100 to be small.

A partition wall 48 is provided within the large-diameter cylindrical part 14A of the spindle 14. The partition wall 48 is formed of an annular plate body and is removably mounted at its outer peripheral side to an inner peripheral side of the large-diameter cylindrical part 14A of the spindle 14 by bolts or the like. The partition wall 48 is configured to divide an inside of the spindle 14 into a motor accommodating space part 48A for accommodating the electric motor 16 and a cylindrical space part 48B for communicating with the inside of the wheel mounting cylinder 18 all the time.

A suction pipe 49 is provided in a position lower than the input shaft 42 in the spindle 14, and extends axially between the spindle 14 and the input shaft 42. The suction pipe 49 collects the lubricant oil 100 reserved in the wheel mounting cylinder 18, and one side of the suction pipe 49 in the length direction is connected to a suction side of a lubricant oil pump 50. The other side (a front end side) of the suction pipe 49 in the length direction is bent in an L-letter shape downward from the lower side of the input shaft 42, and is inserted in the radial hole 14G of the spindle 14.

A supply pipe 51 is located in a position higher than the input shaft 42 in the spindle 14, and extends axially between the spindle 14 and the input shaft 42. One side of the supply pipe 51 in the length direction is connected via an oil cooler 52 to a delivery side of the lubricant oil pump 50. The other end (a front end side) of the supply pipe 51 in the length direction becomes a free end, which is inserted in the cylindrical protrusion part 41A of the second-stage carrier 41. Accordingly, the lubricant oil 100 reserved in the wheel mounting cylinder 18 is suctioned through the suction pipe 49 into the lubricant oil pump 50. The lubricant oil 100 delivered from the lubricant oil pump 50 is cooled by the oil cooler 52, which is thereafter supplied through the supply pipe 51 into the cylindrical protrusion part 41A of the carrier 41 to lubricate the reduction gear mechanism 27 and the like. The halfway sections of the suction pipe 49 and the supply pipe 51 in the length direction axially extend through the outer retainer 44, and are positioned via the outer retainer 44 within the spindle 14.

The lubricant oil 100 reserved in the inside of the wheel mounting cylinder 18 generates a behavior of sticking to an inner peripheral surface of the wheel mounting cylinder 18 by a centrifugal force when the rear wheel 4 rotates at the traveling of the dump truck 1. In this case, a suction port of the suction pipe 49 is separate from the oil surface of the lubricant oil 100, and the lubricant oil 100 cannot be suctioned by the lubricant oil pump 50, creating a defect that the lubricant oil pump 50 is in an idling state. Therefore, for example, at the traveling of the dump truck 1, the lubricant oil pump 50 is stopped. Meanwhile, when the dump truck 1 is stopped for performing a loading work of cargo to the vessel 5 or a discharging work of cargo from the vessel 5, the lubricant oil pump 50 operates to deliver the lubricant oil 100 via the suction pipe 49, the supply pipe 51 and the like to the reduction gear mechanism 27 and the like.

Figure 4:
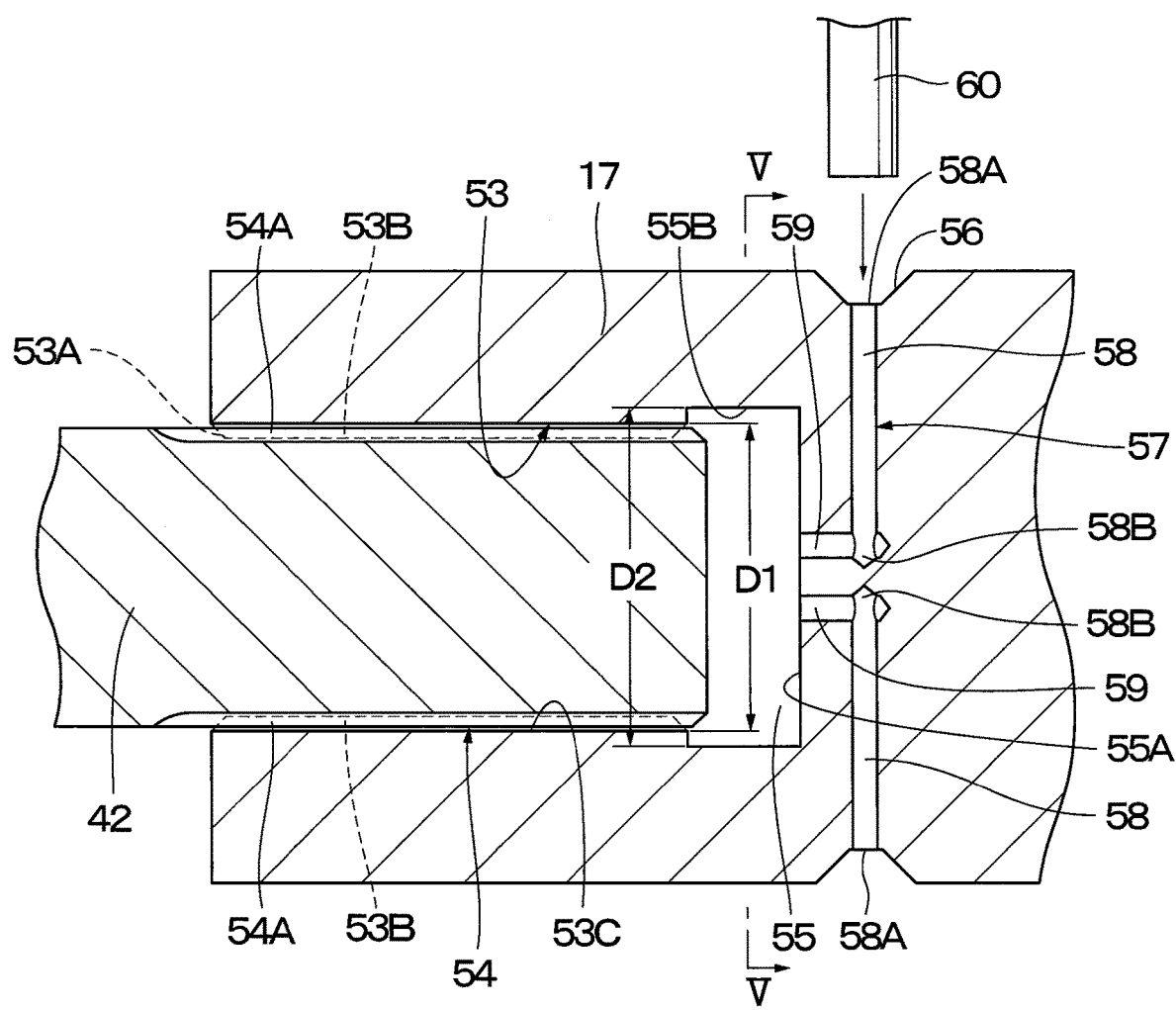
FIG. 4 is an enlarged cross section showing an essential part of a hole spline, a shaft spline, an oil reservoir space, an annular oil groove, a radial oil path, an axial oil path and the like in FIG. 3.
Figure 5:
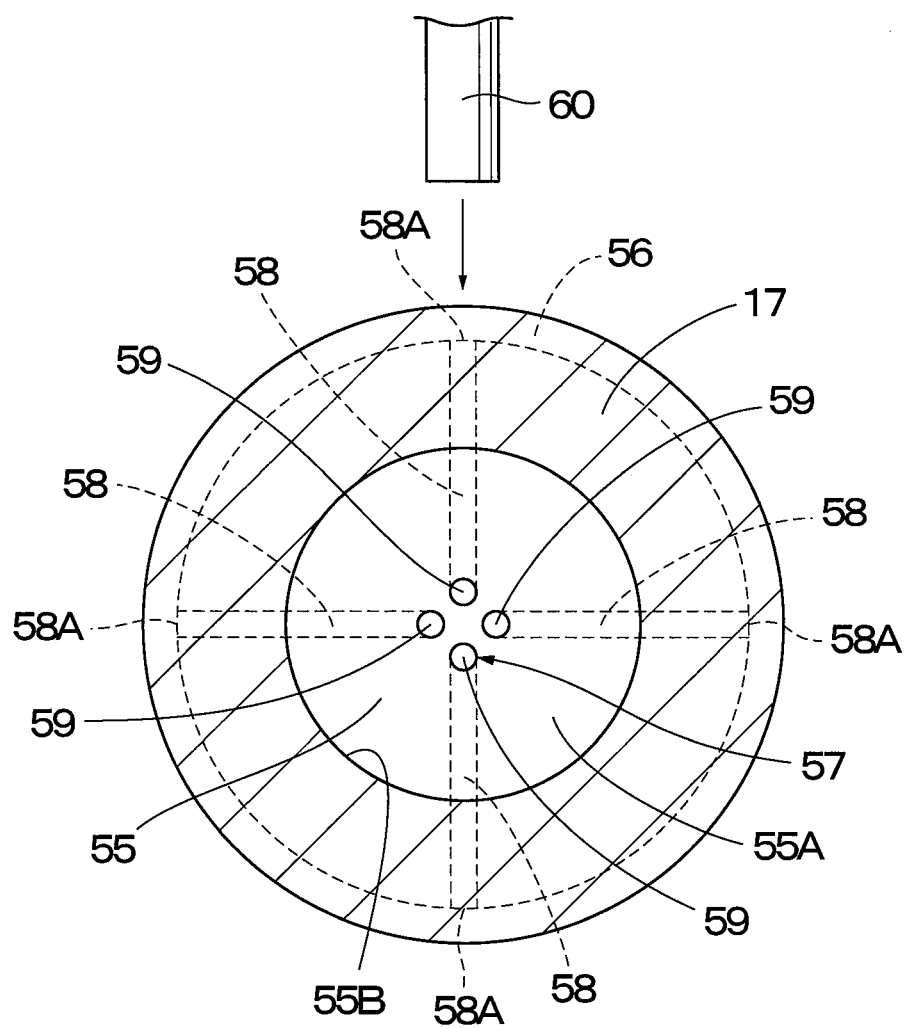
FIG. 5 is a cross section showing the oil reservoir space, the annular oil groove, the radial oil path, the axial oil path and the like as viewed in a direction of arrows V-V in FIG. 4.

Next, an explanation will be made of a lubricating system for lubricating the spline joint between the output shaft 17 and the input shaft 42. The lubricating system is, as shown in FIG. 4 and FIG. 5, configured by including the hole spline 53, the shaft spline 54, an oil reservoir space 55, an annular oil groove 56, an oil path 57, a nozzle 60 and the like.

The hole spline 53 is provided on an inner peripheral surface of a bottomed hole formed in a front end of the output shaft 17. The hole spline 53 has an open end 53A at a front end side of the output shaft 17, and extends axially from the open end 53A toward the oil reservoir space 55 to be described later. Here, a diameter of a tooth root 53C of a plurality of spline teeth 53B defining the hole spline 53 is a tooth root circle diameter D1.

The shaft spline 54 is provided on an outer peripheral surface of an axial base end of the input shaft 42. The shaft spline 54 has a plurality of spline teeth 54A meshing with the respective spline teeth 53B of the hole spline 53, and axially extends with an axial length corresponding to the hole spline 53. The shaft spline 54 is spline-coupled to the hole spline 53, and thereby the output shaft 17 and the input shaft 42 are connected coaxially.

The oil reservoir space 55 is provided in the axial innermost part (the electric motor 16—side) of the hole spline 53 provided in the output shaft 17. That is, the oil reservoir space 55 is provided in a range of being closer to the bottom part side (an axial oil path 59—side to be described later) than a meshing part between the spline teeth 53B of the hole spline 53 and the spline teeth 54A of the shaft spline 54 in the bottom hole in which the hole spline 53 is formed. The oil reservoir space 55 is formed of a cylindrical bottomed hole disposed concentrically to the hole spline 53, and is surrounded by a bottom surface 55A and an inner peripheral surface 55B. The oil reservoir space 55 is to reserve the lubricant oil 100 to be supplied to the spline joint between hole spline 53 and the shaft spline 54. Here, an inner diameter dimension D2 of the oil reservoir space 55 is formed to be larger than a tooth root circle diameter D1 of the hole spline 53 (D2>D1). Thereby, the lubricant oil 100 reserved in the oil reservoir space 55 is supplied to gaps between the respective spline teeth 53B of the hole spline 53 and the respective spline teeth 54A of the shaft spline 54 spline-coupled thereto.

The annular oil groove 56 as an entire circumference oil path is provided to be recessed on a front end-side outer peripheral surface of the output shaft 17. Specifically, the annular oil groove 56 is formed as an annular recessed groove by recessing an outer peripheral surface of the output shaft 17 over an entire circumference in a position separate to the base end side (the electric motor 16—side) from the oil reservoir space 55. The annular oil groove 56 is disposed in a position right under the nozzle 60 to be described later, and the lubricant oil 100 is supplied to the annular oil groove 56 from the nozzle 60.

The oil path 57 is provided in the output shaft 17, and provides communication between the oil reservoir space 55 and the annular oil groove 56. The oil path 57 is configured to include a plurality of radial oil paths 58 and a plurality of axial oil paths 59.

The plurality (for example, four pieces) of radial oil paths 58 are arranged at regular angle intervals (for example, 90 degrees) in the circumferential direction, and are provided to extend in a radial direction of the output shaft 17. The plurality of radial oil paths 58 extend radially about the shaft center of the output shaft 17, and radial outer ends 58A of the respective radial oil paths 58 respectively open to a groove bottom of the annular oil groove 56. Meanwhile, radial inner ends 58B of the respective radial oil paths 58 are arranged in the vicinity of the shaft center of the output shaft 17, and are connected to the respective axial oil paths 59 to be described later.

The plurality (for example, four pieces) of axial oil paths 59 are provided to extend in an axial direction of the output shaft 17 from the bottom surface 55A of the oil reservoir space 55. The plurality of axial oil paths 59 have axial base ends communicated with the radial inner ends 58B of the respective radial oil paths 58, and axial front ends opened to the oil reservoir space 55. That is, the respective axial oil paths 59 provide connection between the radial inner ends 58B of the respective radial oil paths 58 and the oil reservoir space 55. Thereby, the oil reservoir space 55 is communicated through the oil path 57 composed of the radial oil path 58 and the axial oil path 59 to the annular oil groove 56.

Figure 6:
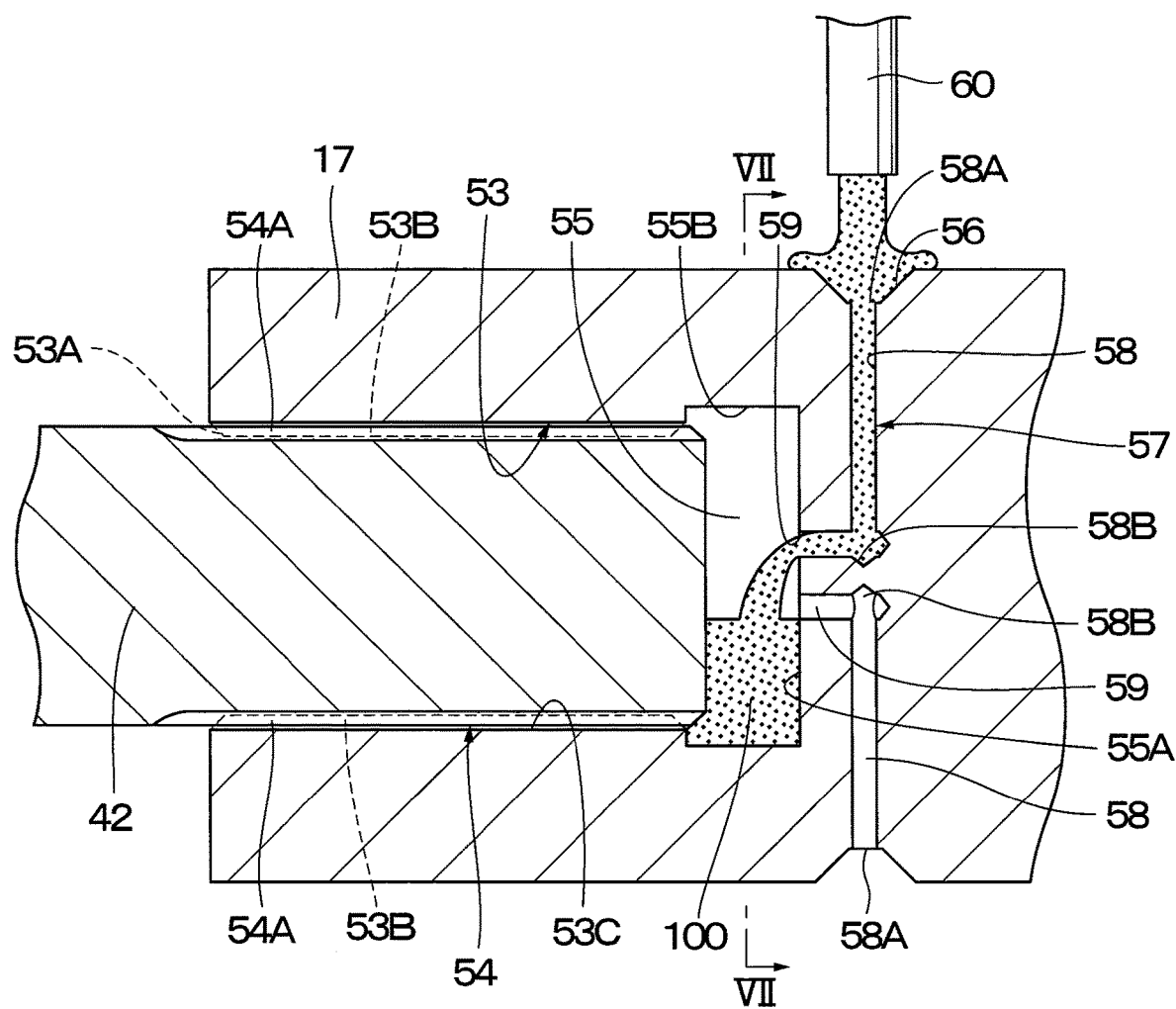
FIG. 6 is a cross section showing a state where lubricant oil is supplied into the oil reservoir space in a position as similar to FIG. 4.

The nozzle 60 is disposed on an outer peripheral side of the output shaft 17, and supplies the lubricant oil 100 to the annular oil groove 56. The nozzle 60 is provided to branch downward from the halfway section of the supply pipe 51 in the length direction, that is, a section right above the annular oil groove 56. Accordingly, at the stopping of the dump truck 1 a part of the lubricant oil 100 delivered to the supply pipe 51 from the lubricant oil pump 50 is, as shown in FIG. 6, supplied toward the annular oil groove 56 from the nozzle 60. The lubricant oil 100 supplied to the annual oil groove 56 flows along the annular oil groove 56, and after that, is introduced via the radial oil path 58 and the axial oil path 59 to the oil reservoir space 55, and is reserved in the oil reservoir space 55.

Figure 7:
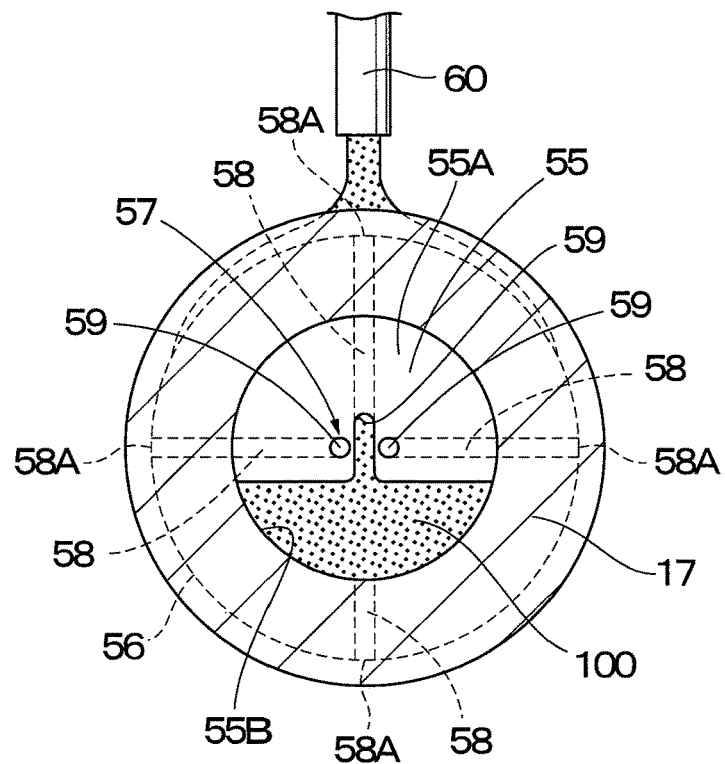
FIG. 7 is a cross section showing a state where lubricant oil is supplied into the oil reservoir space as viewed in a direction of arrows VII-VII in FIG. 6.
Figure 8:
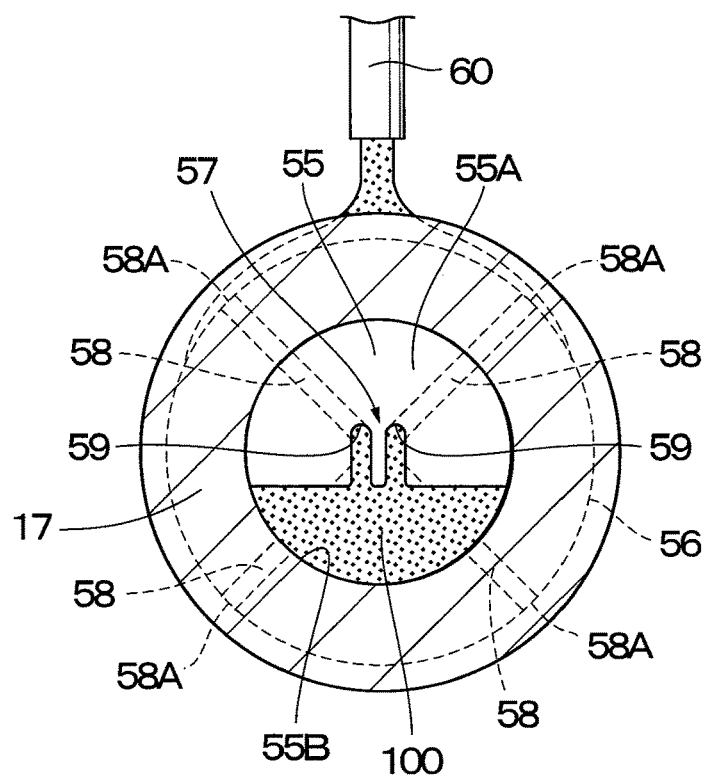
FIG. 8 is a cross section showing a state where an output shaft in FIG. 7 is rotated by 45 degrees.

In this case, as shown in FIG. 7 and FIG. 8, the respective radial oil paths 58 are arranged at regular angle intervals (for example, 90 degrees) in the circumferential direction. Thereby, in a case where the dump truck 1 is stopped, the outer end 58A of at least the one radial oil path 58 opens upward. Accordingly, the lubricant oil 100 supplied to the annular oil groove 56 from the nozzle 60 can be securely introduced via the radial oil path 58 and the axial oil path 59 to the oil reservoir space 55.

Figure 9:
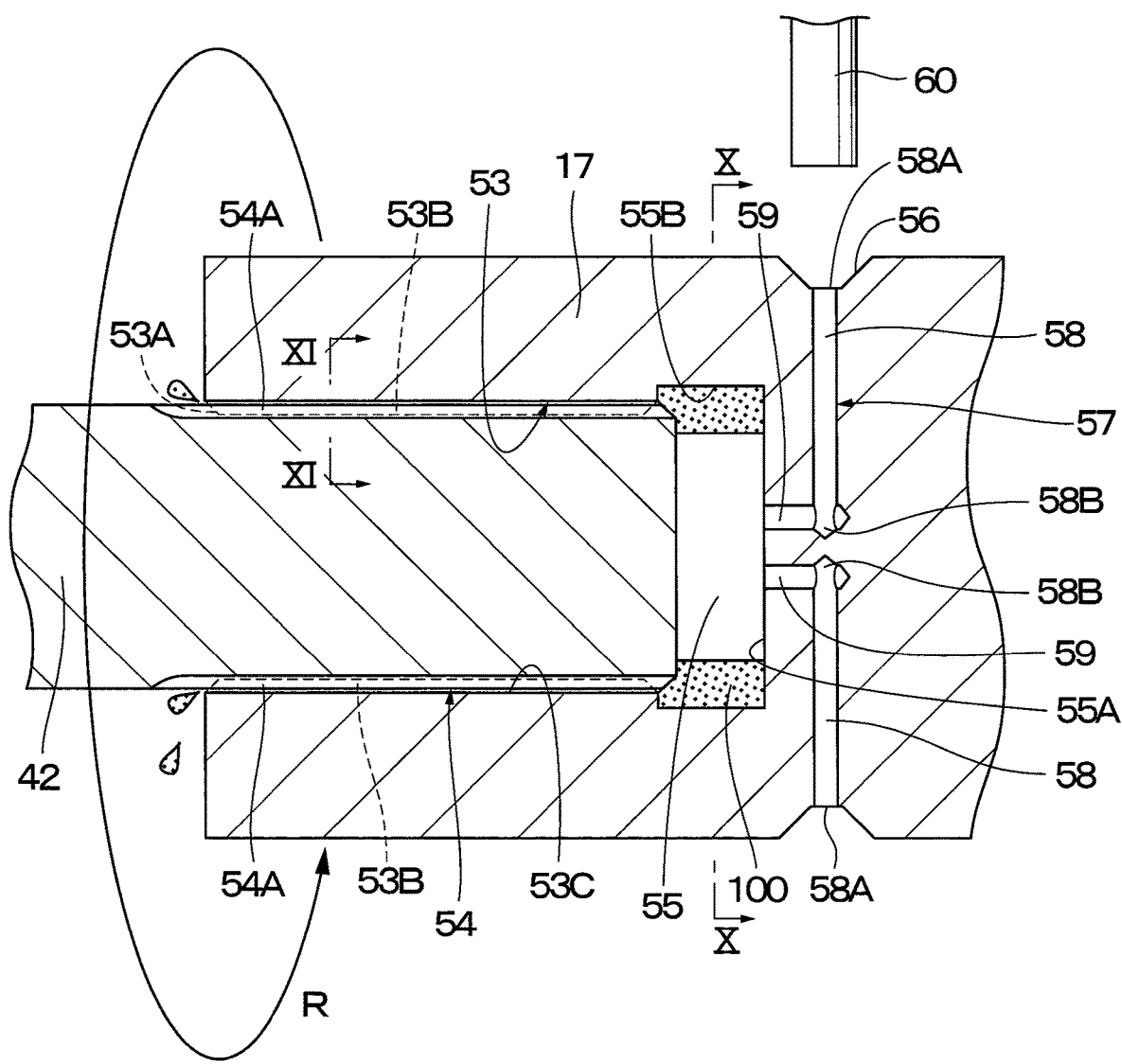
FIG. 9 is a cross section showing a state where the lubricant oil in the oil reservoir space is supplied to a spline joint by the rotation of the output shaft in a position as similar to FIG. 4.
Figure 10:
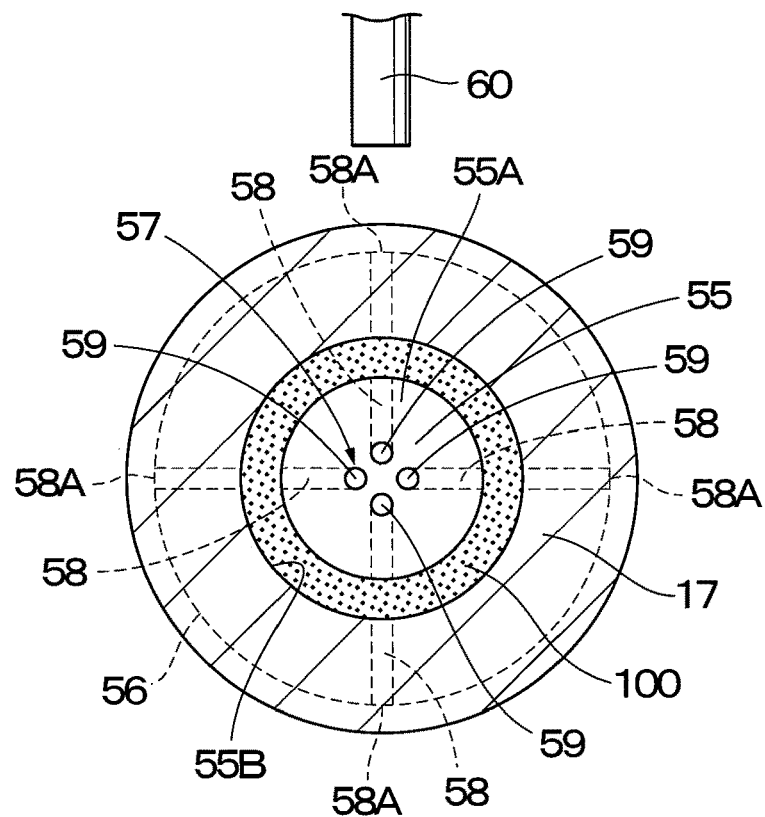
FIG. 10 is a cross section showing a behavior of lubricant oil in the oil reservoir space at the rotating of the output shaft as viewed in a direction of arrows X-X in FIG. 9.
Figure 11:
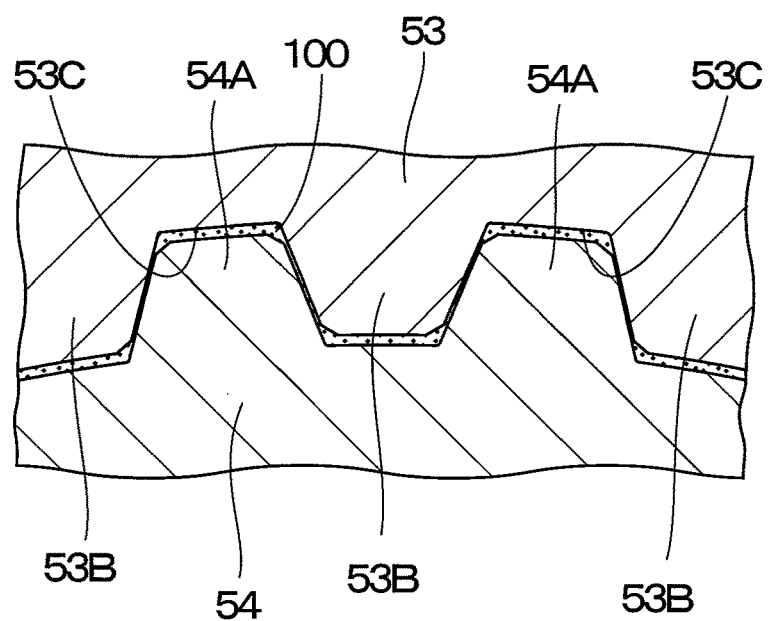
FIG. 11 is a cross section showing a state where lubricant oil is supplied into gaps between the hole spline and the shaft spline as viewed in a direction of arrows XI-XI in FIG. 9.

In addition, as shown in FIG. 9 and FIG. 10, at the traveling of the dump truck 1, when the output shaft 17 rotates in a direction of arrow R, the lubricant oil 100 reserved in the oil reservoir space 55 is pushed against the inner peripheral surface 55B of the oil reservoir space 55 by a centrifugal force, generating a behavior of sticking to an entire surface of the inner peripheral surface 55B. In this case, an inner diameter dimension D2 of the oil reservoir space 55 is formed to be larger than a tooth root circle diameter D1 of the hole spline 53. Therefore, the lubricant oil 100 pushed against the inner peripheral surface 55B of the oil reservoir space 55, as shown in FIG. 11, flows into the gaps between the respective spline teeth 53B of the hole spline 53 and the respective spline teeth 54A of the shaft spline 54, and axially flows toward the open end 53A of the hole spline 53 from the oil reservoir space 55. It should be noted that the lubricant oil 100 pushed against the inner peripheral surface 55B of the oil reservoir space 55 separates from front ends of the respective axial oil paths 59 opened to the oil reservoir space 55. Accordingly, the lubricant oil 100 in the oil reservoir space 55 do not flow back via the respective axial oil paths 59 and the respective radial oil paths 58 to the annular oil groove 56.

The traveling device 11 of the dump truck 1 according to the first embodiment has the aforementioned configuration, and hereinafter, an operation thereof will be explained.

First, when an operator which gets in the cab 7 of the dump truck 1 activates the engine 8, the hydraulic pump as a hydraulic source is driven and rotated, and power is generated by a power generator (any thereof is not shown). At the traveling of the dump truck 1, the power is supplied from the power generator to the electric motor 16, and thereby, the electric motor 16 is activated to rotate the output shaft 17, and the input shaft 42 spline-coupled to the output shaft 17 rotates.

The rotation of the input shaft 42 is decelerated by the sun gear 29 of the first-stage planetary gear reduction mechanism 28, which is transmitted to the respective planetary gears 31, and the rotation of each of the planetary gears 31 is decelerated through the internal gear 30 and the coupling 35, which is transmitted to the sun gear 37 of the second-stage planetary gear reduction mechanism 36. In the second-stage planetary gear reduction mechanism 36, the rotation of the sun gear 37 is decelerated, which is transmitted to the respective planetary gears 39. At this time, since the cylindrical protrusion part 41A of the carrier 41 supporting the respective planetary gears 39 is spline-coupled to the circular cylindrical part 14B of the spindle 14, the revolving movements of the respective planetary gears 39 (rotation of the carrier 41) are restricted.

As a result, each of the planetary gears 39 rotates only on its axis around the sun gear 37, and rotation decelerated by the rotation of each of the planetary gears 39 on its axis is transmitted to the internal gear 38 fixed to the wheel mounting cylinder 18. Thereby, the wheel mounting cylinder 18 rotates with the large rotational torque obtained by the two-stage speed reduction through the first-stage planetary gear reduction mechanism 28 and the second-stage planetary gear reduction mechanism 36. In consequence, the left and right rear wheels 4 as the drive wheels can rotate together with the wheel mounting cylinder 18 to drive the dump truck 1 for travel.

The dump truck 1 travels between a loading work area performing a loading work of cargo to the vessel 5 and a discharging work area performing a discharging work of cargo from the vessel 5, for example. The dump truck 1 stops in the loading work area and the discharging work area and an operation of the traveling device is stopped.

At the traveling of the dump truck 1 (at the operating of the electric motor 16), the lubricant oil 100 reserved in the wheel mounting cylinder 18 is stirred upwards in order by rotation of the wheel mounting cylinder 18, the respective planetary gears 31 and 39 in the first and second stage planetary gear reduction mechanisms 28 and 36, and the like. The lubricant oil 100 is supplied to meshing sections of the respective sun gears 29, 37 and the respective planetary gears 31, 39, the bearings 20 and 21, and the like, and after that, is reserved in the lower part side of the wheel mounting cylinder 18. Here, at the traveling of the dump truck 1, since the lubricant oil pump 50 is stopped, the supply of the lubricant oil 100 to the annular oil groove 56 from the nozzle 60 is not performed.

Meanwhile, at the stopping of the dump truck 1 (at the stopping of the electric motor 16), the lubricant oil pump 50 operates. In consequence, the lubricant oil 100 reserved in the lower part side of the wheel mounting cylinder 18 is suctioned via the suction pipe 49 to the lubricant oil pump 50, is cooled by the oil cooler 52, and thereafter, is delivered to the supply pipe 51. Therefore, the lubricant oil 100 can be supplied from the front end of the supply pipe 51 into the cylindrical protrusion part 41A of the second-stage carrier 41, and the periphery of the reduction gear mechanism 27 in the wheel mounting cylinder 18 can be filled with the lubricant oil 100.

At this time, a part of the lubricant oil 100 delivered to the supply pipe 51 from the lubricant oil pump 50 is supplied via the nozzle 60 branched from the supply pipe 51 to the annular oil groove 56 formed on the outer peripheral surface of the output shaft 17. As shown in FIG. 6 to FIG. 8, the lubricant oil 100 supplied to the annular oil groove 56 flows along the annular oil groove 56, and thereafter, is introduced via the radial oil path 58 and axial oil path 59 to the oil reservoir space 55. In this way, at the traveling of the dump truck 1 (at the operating of the electric motor 16), it is possible to reserve a sufficient amount of lubricant oil 100 within the oil reservoir space 55 of the output shaft 17.

In addition, as shown in FIG. 9 and FIG. 10, at the traveling of the dump truck 1, when the output shaft 17 rotates in a direction of arrow R, the lubricant oil 100 reserved in the oil reservoir space 55 is pushed against the inner peripheral surface 55B of the oil reservoir space 55 by a centrifugal force, generating a behavior of sticking to an entire surface of the inner peripheral surface 55B. In this case, the inner diameter dimension D2 of the oil reservoir space 55 is formed to be larger than the tooth root circle diameter D1 of the hole spline 53. Therefore, the lubricant oil 100 pushed against the inner peripheral surface 55B of the oil reservoir space 55 by the centrifugal force is pushed out into the gaps between the respective spline teeth 53B of the hole spline 53 and the respective spline teeth 54A of the shaft spline 54 (refer to FIG. 11). Accordingly, the lubricant oil 100 goes through the gaps between the respective spline teeth 53B of the hole spline 53 and the respective spline teeth 54A of the shaft spline 54, flows toward the open end 53A of the hole spline 53 from the oil reservoir space 55, and is discharged to an exterior from the open end 53A.

In this way, at the traveling of the dump truck 1, clean lubricant oil 100 can be sufficiently supplied over an entire region of the spline joint between hole spline 53 and the shaft spline 54. At the traveling of the dump truck 1, when a rotational load of a large torque acts on the spline joint between the hole spline 53 and the shaft spline 54, in some cases, abrasion powder is generated in the spline joint. However, the abrasion powder is discharged to an exterior of the spline joint by the lubricant oil 100 flowing in the gaps between the respective spline teeth 53B of the hole spline 53 and the respective spline teeth 54A of the shaft spline 54. Thereby, it is possible to suppress the abrasion of the hole spline 53 and the shaft spline 54 from being accelerating by the remaining abrasion powder, and to supply the lubricant oil 100 on the entire circumference of the spline joint. As a result, since it is possible to extend a lifetime of the hole spline 53 and the shaft spline 54, the reliability of the traveling device 11 can be enhanced.

In addition, according to the first embodiment, the output shaft 17 in which the hole spline 53 is formed is provided with the oil reservoir space 55, the annular oil groove 56 and the oil path 57. Meanwhile, there is adopted a simple structure that only the nozzle 60 is provided in the supply pipe 51 defining a circulation system of the lubricant oil 100 within the wheel mounting cylinder 18 together with the suction pipe 49 and the lubricant oil pump 50. As a result, the spline joint between the hole spline 53 and the shaft spline 54 can be appropriately lubricated without the complication of the structure of the traveling device 11, and the manufacturing cost also can be suppressed.

In this way, the traveling device 11 according to the present embodiment is provided with the electric motor 16 provided on the vehicle body 2 of the dump truck 1 having the front wheels 3 and the rear wheels 4, the output shaft 17 the axial base end of which is connected to the electric motor 16 and which outputs the rotation of the electric motor 16, the bottomed hole spline 53 formed in the axial front end of the output shaft 17, and the input shaft 42 which has the shaft spline 54 spline-coupled to the hole spline 53 and inputs the rotation of the output shaft 17 to the reduction gear mechanism 27. The output shaft 17 is provided with the oil reservoir space 55 which is formed in the innermost part of the hole spline 53, the annular oil groove 56 which is separated axially toward the base end side from the oil reservoir space 55, and the oil path 57 which provides the communication between the oil reservoir space 55 and the annular oil groove 56 and which supplies the lubricant oil supplied to the annular oil groove 56 to the oil reservoir space 55. The inner diameter dimension D2 of the oil reservoir space 55 is formed to be larger than the tooth root circle diameter D1 of the hole spline 53, and the lubricant oil 100 in the oil reservoir space 55 is supplied to the spline joint between the hole spline 53 and the shaft spline 54 by the rotation of the output shaft 17.

Thereby, the lubricant oil 100 reserved in the oil reservoir space 55 is pushed out into the gaps between the respective spline teeth 53B of the hole spline 53 and the respective spline teeth 54A of the shaft spline 54 by using the centrifugal force by the rotation of the output shaft 17. As a result, the abrasion powder generated in the spline joint between the hole spline 53 and the shaft spline 54 can be discharged to an exterior by the lubricant oil 100, and the entire circumference of the spline joint can be appropriately lubricated.

In addition, the oil path 57 includes the plurality of radial oil paths 58 the radial outer ends 58A of which open to the annular oil groove 56 and which extend in the radial direction of the output shaft 17, and the plurality of axial oil paths 59 which provide connection between the radial inner ends 58B of the respective radial oil paths 58 and the oil reservoir space 55 and are provided to extend in the axial direction of the output shaft 17. Thereby, the radial oil path 58 and the axial oil path 59 defining the oil path 57 can be easily formed in the output shaft 17.

Further, the entire circumference oil path is configured by the annular oil groove 56 annually recessed on the outer peripheral surface of the output shaft 17, and the lubricant oil 100 is supplied via the nozzle 60 disposed in the outer peripheral side of the output shaft 17 into the annular oil groove 56. In this case, the nozzle 60 is provided using the supply pipe 51 defining the circulation system of the lubricant oil 100 in the wheel mounting cylinder 18 together with the suction pipe 49 and the lubricant oil pump 50. Accordingly, it is not necessary to additionally provide a device for supplying the lubricant oil 100 to the spline joint between the hole spline 53 and the shaft spline 54, and the structure of the traveling device 11 can be simplified.

Figure 12:
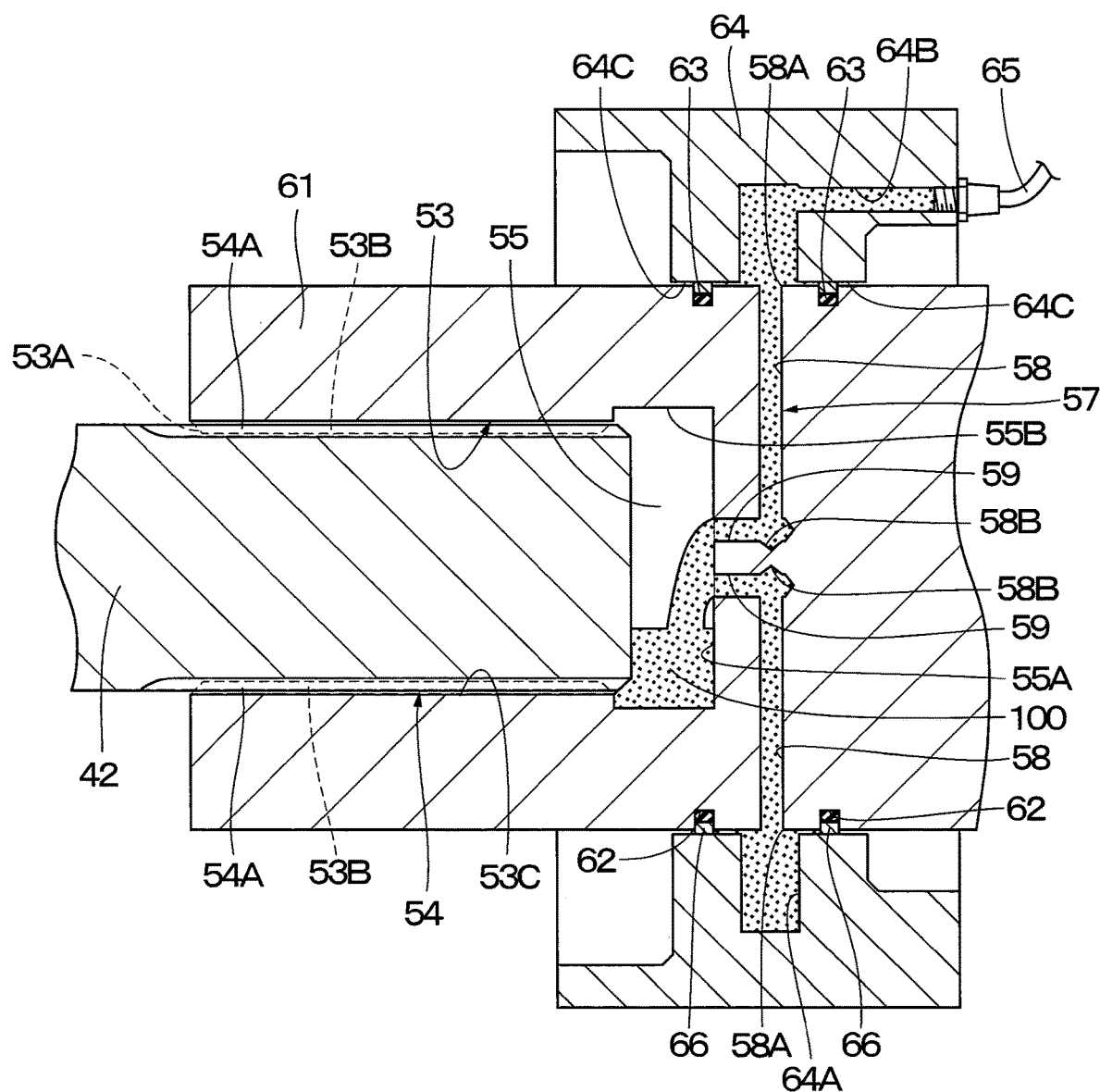
FIG. 12 is a cross section showing an oil reservoir space, a radial oil path, an axial oil path, a cylindrical member, an entire circumference groove, a seal ring and the like according to a second embodiment as viewed in a position as similar to FIG. 6.

Next, FIG. 12 shows a second embodiment of the present invention. The second embodiment is characterized in that a cylindrical member surrounding an output shaft is provided in an outer peripheral side of the output shaft and an entire circumference groove as an entire circumference oil path is formed on an inner peripheral surface of the cylindrical member. It should be noted that in the second embodiment, components identical to those in the first embodiment are referred to as identical reference numerals, and an explanation thereof is omitted.

In the figure, an output shaft 61 is, as similar to the output shaft 17 according to the first embodiment, provided with the hole spline 53, the oil reservoir space 55, the plurality of radial oil paths 58 and the plurality of axial oil paths 59 which are formed on an axial front end side thereof. However, the output shaft 61 differs from the output shaft 17 according to the first embodiment, in a point where a pair of O-ring mounting grooves 62, to be described later are formed on an outer peripheral surface thereof.

The pair of O-ring mounting grooves 62 are formed in two locations, which sandwich the respective radial oil paths 58, on the outer peripheral surface of the output shaft 61 over an entire circumference. An O-ring 63 made up of an elastic material such as rubber is mounted to each of the O-ring mounting grooves 62, and an inner peripheral side of each of seal rings 66 to be described later are inserted therein.

A cylindrical member 64 is fixed to the casing of the electric motor 16 or the spindle 14, for example, by using a bracket (not shown) or the like, as shown in FIG. 3. An inner peripheral side of the cylindrical member 64 is inserted on an outer peripheral surface of the output shaft 61. That is, the output shaft 61 is rotatable to the cylindrical member 64. An entire circumference groove 64A in an annular shape as an entire circumference oil path is formed in a section, which corresponds to each of the radial oil paths 58 of the output shaft 61, on the inner peripheral surface of the cylindrical member 64. The radial outer end 58A of each of the radial oil paths 58 opens to the entire circumference groove 64A. An oil path 64B communicated with the entire circumference groove 64A is formed in the cylindrical member 64, and the oil path 64B is connected via the connecting pipe 65 to the halfway section of the supply pipe 51, as shown in FIG. 3, for example. Therefore, a part of the lubricant oil 100 delivered into the supply pipe 51 from the lubricant oil pump 50 is supplied via the connecting pipe 65 and the oil path 64B to the entire circumference groove 64A. In addition, two locations, which axially sandwich the entire circumference groove 64A, on the inner peripheral surface of the cylindrical member 64 become seal sliding contact surfaces 64C, and an outer peripheral surface of each of the seal rings 66 makes sliding contact with each of the seal sliding contact surfaces 64C.

The pair of the seal rings 66 are provided between the output shaft 61 and the cylindrical member 64. Each of the seal rings 66 suppresses the lubricant oil supplied to the entire circumference groove 64A of the cylindrical member 64 from leaking into an exterior through a gap between the output shaft 61 and the cylindrical member 64. The inner peripheral side of each of the seal rings 66 is disposed within the O-ring mounting groove 62 of the output shaft 61, and an outer peripheral surface of each of the seal rings 66 makes sliding contact with the seal sliding contact surface 64C of the cylindrical member 64 with an appropriate pressing force.

The traveling device according to the second embodiment has the lubricating mechanism of the spline joint as described above. At the traveling of the dump truck 1, a part of the lubricant oil 100 delivered to the supply pipe 51 from the lubricant oil pump 50 is supplied to the entire circumference groove 64A of the cylindrical member 64 through the connecting pipe 65 branched from the supply pipe 51. The lubricant oil 100 supplied to the entire circumference groove 64A is introduced via the radial oil path 58 and the axial oil path 59, which are provided in the output shaft 61, to the oil reservoir space 55.

In addition, at the traveling of the dump truck 1, when the output shaft 61 rotates, the lubricant oil 100 reserved in the oil reservoir space 55 is pushed against the inner peripheral surface 55B of the oil reservoir space 55 by a centrifugal force. Thereby, also in the second embodiment, the lubricant oil 100 flows into the gaps between the respective spline teeth 53B of the hole spline 53 and the respective spline teeth 54A of the shaft spline 54, and flows toward the open end 53A of the hole spline 53 from the oil reservoir space 55. As a result, the abrasion powder generated in the spline joint can be discharged to an exterior, and it is possible to appropriately lubricate the spline joint between the hole spline 53 and the shaft spline 54.

It should be noted that the embodiment shows the configuration of supplying a part of the lubricant oil 100 delivered to the supply pipe 51 from the lubricant oil pump 50 to the oil reservoir space 55 as an example. However, the present invention is not limited thereto, but, for example, a pump different from the lubricant oil pump 50 may be used to supply the lubricant oil 100 to the oil reservoir space 55.

The embodiment shows a case where the four radial oil paths 58 and the four axial oil paths 59 are provided in the output shaft 17 (61) as an example. However, the present invention is not limited thereto, but, for example, three, or five or more radial oil paths and axial oil paths may be provided. Further, one axial oil path may be formed in the shaft center of an output shaft and a radial inner end of each of radial oil paths may open to the one axial oil path.

The embodiment is explained by taking the dump truck 1 of the rear-wheel-drive system as an example. However, the present invention is not limited thereto, but may be applied to a dump truck of, for example, a front-wheel-drive system, or a four-wheel-drive system driving both front and rear wheels. Further, the present invention is not limited to a dump truck, but may be widely applied to a working vehicle having wheels, such as a wheel type excavator or a wheel loader.

DESCRIPTION OF REFERENCE NUMERALS

1: Dump truck (Working vehicle)
2: Vehicle body

3: Front wheel (Vehicle wheel)
4: Rear wheel (Vehicle wheel)
16: Electric motor
17, 61: Output shaft
27: Reduction gear mechanism (Reduction mechanism)
42: Input shaft
53: Hole spline
54: Shaft spline
55: Oil reservoir space
56: Annular oil groove (Entire circumference oil path)
57: Oil path
58: Radial oil path
58A: Outer end
58B: Inner end
59: Axial oil path
60: Nozzle
64A: Entire circumference groove (Entire circumference oil path)

The invention claimed is:

1. A working vehicle with a traveling device having wheels, comprising:
   an electric motor provided on a vehicle body of a working vehicle having wheels;
   an output shaft an axial base end of which is connected to the electric motor and which outputs rotation of the electric motor;
   a reduction mechanism which is provided in the vehicle body and reduces rotation of the output shaft to be transmitted to the wheels;
   a bottomed hole spline formed in an axial front end of the output shaft; and
   an input shaft which has a shaft spline spline-coupled to the hole spline and inputs the rotation of the output shaft to the reduction mechanism, characterized in that:
   the output shaft is provided with;
   an oil reservoir space which is formed in an axial innermost part of the hole spline to reserve the lubricant oil,
   an entire circumference oil path which is separated axially toward the base end side from the oil reservoir space and is formed over an entire circumference in an outer circumference side of the output shaft, and
   an oil path which provides communication between the oil reservoir space and the entire circumference oil path and supplies the lubricant oil supplied to the entire circumference oil path to the oil reservoir space, and
   an inner diameter dimension of the oil reservoir space is formed to be larger than a tooth root circle diameter of the hole spline to cause the lubricant oil in the oil reservoir space to be supplied to the spline joint between the hole spline and the shaft spline by the rotation of the output shaft.

2. The working vehicle with the traveling device having the wheels according to claim 1, wherein
   the oil path includes:
   a plurality of radial oil paths radial outer ends of which open to the entire circumference oil path and which extend in a radial direction of the output shaft; and
   a plurality of axial oil paths which provide connection between radial inner ends of the respective radial oil paths and the oil reservoir space and are provided to extend in an axial direction of the output shaft.

3. The working vehicle with the traveling device having the wheels according to claim 1, wherein
   the entire circumference oil path includes an annular oil groove annually recessed on an outer peripheral surface of the output shaft, and the lubricant oil is supplied via a nozzle disposed in an outer peripheral side of the output shaft into the annular oil groove.

* * * * *